INVENTOR
DANIEL E. BEGUIN

INVENTOR
DANIEL E. BEGUIN
ATTORNEY

United States Patent Office 3,510,875
Patented May 5, 1970

3,510,875
MULTIMODE HORN
Daniel Edmond Beguin, Saint-Prix, France, assignor to International Standard Electric Corporation, New York, N.Y., a corporation of Delaware
Filed July 9, 1968, Ser. No. 743,499
Claims priority, application France, July 20, 1967, 114,931
Int. Cl. H01q 13/02
U.S. Cl. 343—786     2 Claims

ABSTRACT OF THE DISCLOSURE

An H plane multimode horn comprises a section of waveguide which propagates the dominant mode $H_{10}$, a second section of wave guide connected to said first section which propagates modes $H_{20}$ and $H_{10}$, a phasing section connected to said second section which propagates modes $H_{10}$, $H_{20}$ and $H_{30}$ and a horn connected to said phasing section. The length of said phasing section is such that the phase difference between the $H_{10}$ and $H_{30}$ modes is approximately 0 at the center of the horn mouth and the phase difference between $(H_{10}+H_{30})$ and $H_{20}$ are substantially 0 and 180° for positive and negative radiation angles which are respectively measured in the H plane with respect to the central axis.

The present invention relates to multimode horns and more particularly to multimode horns used in radars with simultaneous crossed lobes generally known under the name of "monopulse" radars. It will be briefly reminded that a "monopulse" radar permits angle-error measurement in a coordinate between a main target and a secondary target constituted for instance by a shell explosion.

In a monopulse radar, the aerial system is generally constituted by a focusing system (lens or reflector) located in front of a primary source materialized by a rectangular section horn. In a conventional monopulse aerial system, this horn, the biggest dimension of which, referenced $a$, is the horizontal, comprises a vertical medium partition and the two outputs are connected to a hybrid junction (magic T for instance) which delivers signals equal respectively to the sum and to the difference of the energies collected on the two apertures. These signals, sum and difference, are applied to two receiving channels which constitute the sum channel S and the difference channel D. The sum channel is also called reference channel.

One may also utilize, as a primary source for an aerial system of monopulse radar, a horn without partition which constitutes a multimode source as mentioned in the two articles titled "Optimum Feeds for All Three Modes of a Monopulse Antenna" published in the September 1961 issue of the review "IRE Transactions on Antennas and Propagation" pages 444 to 453 and 454 to 460. Such a multimode source uses the property according to which several modes and their harmonics may propagate simultaneously in a waveguide up to a maximum rank determined by the cut-off frequency of the waveguide. By combining several modes of propagation in a same guide, one may thus elaborate, in the horn mouth, the illumination laws desired for the channels sum S and difference D, the two laws being perfectly independent one from the other.

In "monopulse" radars, one of the most important problems to solve consists in obtaining a shift angle nul or constant between the sum and difference channels for all the useful values of the radiation angle, this angle being measured with respect to the aerial system axis. Besides, it is understood that the width of this range closely depends upon phase angle variations between the sum and difference channels in accordance with the radiation angle. In most of the "monopulse" radars known, the phase angle characteristic between the channels limit, at the same time, the range of measurements and the accuracy of the measurment of angular error.

The object of the present invention is thus to achieve a "multimode" horn for "monopulse" radar in which the phase angle between the sum and difference channels is zero or constant within a large range of values of the radiation angle.

According to one feature of the present invention, a multimode horn for monopulse radar in which the sum channel is obtained by simultaneous presence of modes $H_{10}$ and $H_{30}$ and the difference channel by the mode $H_{20}$ alone, the length of the path according to the axis of the horn of modes $H_{10}$ and $H_{30}$ is chosen such as the phase variations of the field radiated by the sum channel compensate the phase variations of the field radiated by the difference channel.

The above mentioned and other features and objects of this invention will become apparent by reference to the following description taken in conjunction with the accompanying drawings in which:

FIG. 1 represents a cross section in the magnetic plane of a multimode horn for "monopulse" radar. Since in the particular case of utilization, the monopulse radar is provided for carrying out angle-error measurements in bearing coordinate, and since a vertical polarization is required, the magnetic plane is merged with the horizontal plane.

Being known that the high frequency signal to transmit or to receive has a frequency $f$ corresponding to a wavelength $d$, the width $a$ and the height $c$ of the rectangular waveguide 1 are such as the fundamental mode $H_{10}$ propagates in the said guide, viz $d/2 < a < d$ and $c < d/2$.

In order to enable the mode $H_{20}$ to propagate, the width of the guide 1 is increased up to a value $g$ such as $d < g < 3d/2$. This first widening is carried out in two stair-steps 2 and 3 and is followed by a second widening at the value $b$ such as $3d/2 < b < 2d$ in such a way as to enable the mode $H_{30}$ to propagate.

Figure 1:
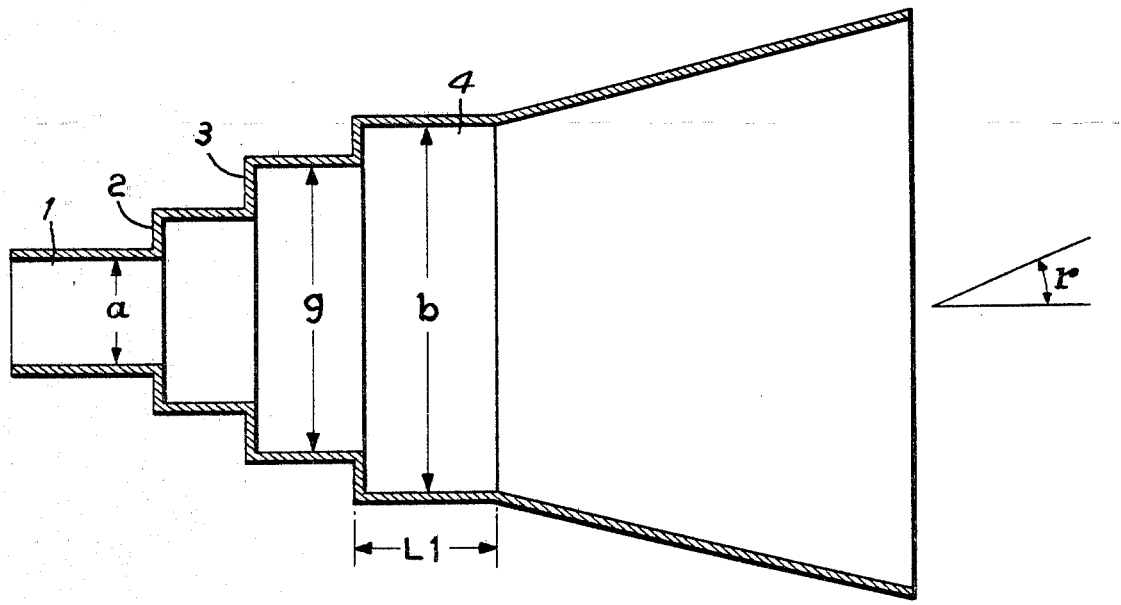
FIG. 1 illustrates a cross section of a multimode horn for "monopulse" radar.
Figure 2:
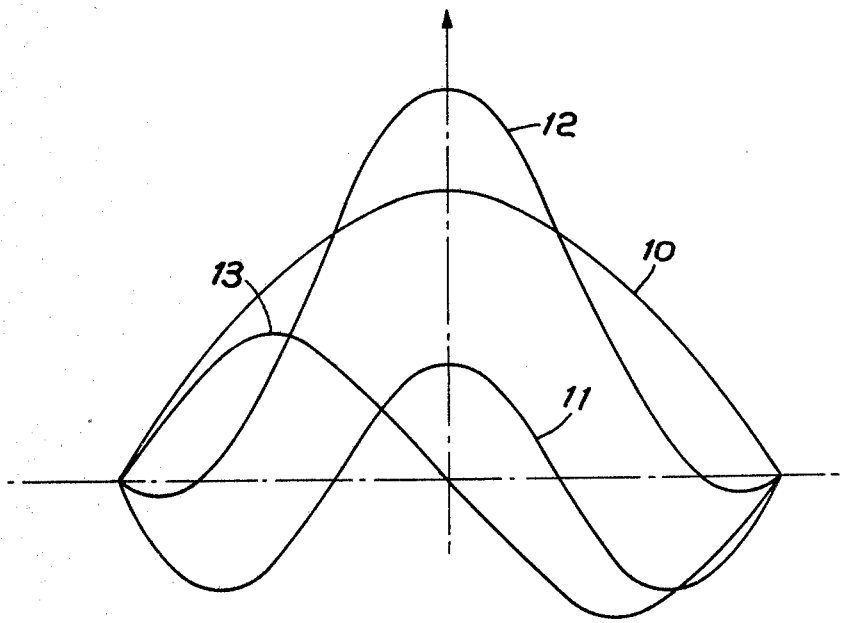
FIG. 2 illustrates electrical field curves of the modes of the sum channel and of the difference channel.

FIGURE 2 illustrates the distribution of the electrical fields of the different modes $H_{10}$, $H_{20}$ and $H_{30}$ in the mouth of the part 4, assuming that no phase angle exists between the different modes. The curves 10 and 11 correspond respectively to the modes $H_{10}$ and $H_{30}$ and the curve 12 is the sum thereof; the radiation pattern of the aerial system with reflector which corresponds to the distribution of the electrical field of the curve 12 presents a main lobe directed according to the axis of the aerial system; this radiation pattern will be that of the sum channel S also called reference channel. The curve 13 of FIGURE 2 gives the diagram of the distribution of the electrical field of the mode $H_{20}$; the corresponding radiation pattern of the aerial system with reflector presents two lobes which are symmetrical with respect to the axis of the antenna; this diagram will be that of the difference channel D. Theory and experiments show that in order to exploit suitably a "monopulse" radar and in particular a coherent Döppler radar operating in "monopulse," it is absolutely necessary that the phase gap between the sum chanel S and the difference channel D of the aerial system should be extremely small in all the useful part of the radiation pattern. Thus, if the phase gaps exceed 5°, the ratios $$\frac{\text{difference}}{\text{sum}}$$

elaborated in the radar receiver present fluctuations which are such as the exploitation of the radar becomes impossible.

In patent application 743,527, filed July 9, 1968, titled Multimode Horn, a process enabling to obtain a plane wave in the mouth of a multimode horn has been described. This process consisted in setting up a phase difference, at the centre of the aperture, between the two modes which propagate in the horn, the laws of variation of the phase of the amplitude of the fields radiated by the said modes, being then such as the phase of the sum of the fields radiated remains practically constant within a wide range of values of the radiation angle. In order to show how this phase difference to be set up between the two modes could be calculated, it had been established that the radiated field G expressed in terms of the radiation angle $r$ was given by the formula:

$$G(r) = |G1(r)|e^{jP1(r)} + ke^{jP0}|G3(r)|e^{jP3(r)} = |G(r)|e^{jP(r)}$$

formula in which $|G1(r)|$ designates the amplitude of the field radiated by one of the two modes, the mode $H_{10}$ for instance, $P1(r)$ designates the corresponding phase for this mode, $|G3(r)|$ designates the amplitude of the field radiated by the second mode, the mode $H_{30}$ for instance, $P3(r)$ designates the corresponding phase for this mode, $k$ is the harmonic ratio between the two modes, i.e. the ratio of the amplitudes of the two modes, P0 is the phase difference which exists between the two modes at the middle of the horn mouth, $j$ is the complex term such as $j^2 = -1$.

By choosing a suitable value for P0, one obtained a phase curve $P(r)$ of the sum of the radiated field which remained practically constant and close to zero degrees within a wide range of values of the radiation angle.

Figure 4:
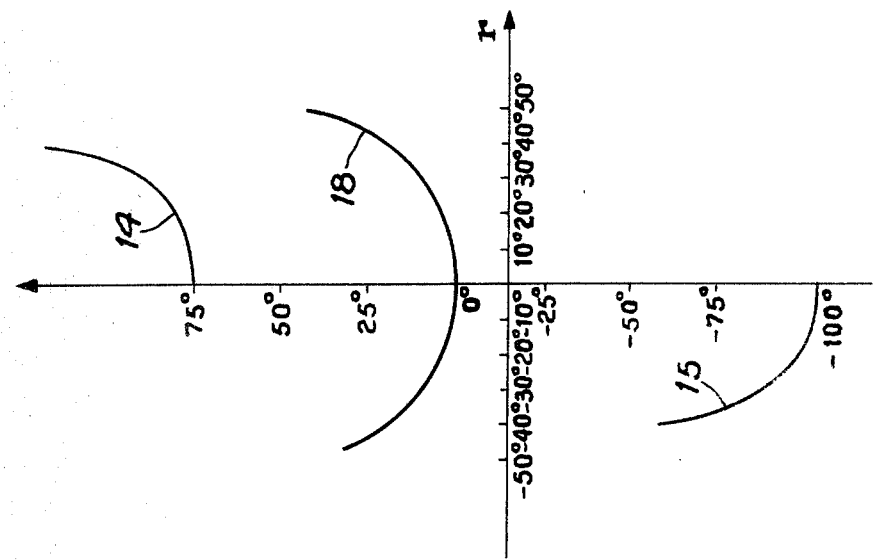
FIG. 4 illustrates the phase curve of the filed radiated by the mode $H_{20}$ as well as a phase curve of the field radiated by the sum channel.
Figure 3:
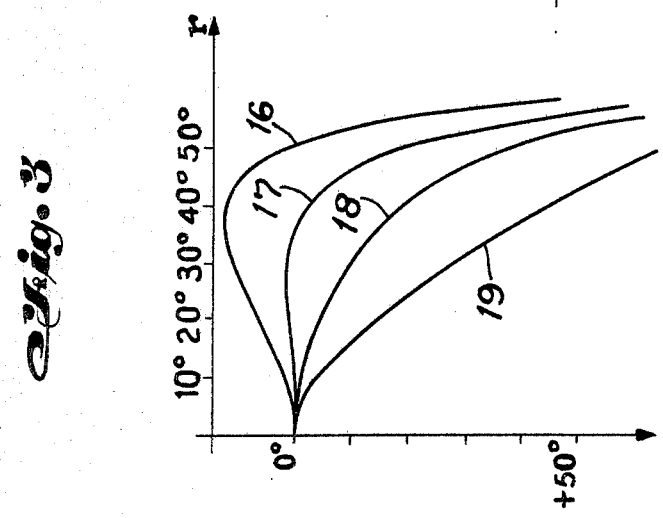
FIG. 3 illustrates phase curves of the field radiated by the sum channel for different values of the phase angle between the modes.

The curves 14 and 15 of FIG. 4 give the phase curve of the field radiated by the mode $H_{20}$ in terms of the radiation angle $r$. FIG. 3 gives also different phase curves of the field radiated by the sum channel for different values of the phase difference P0 between the modes $H_{10}$ and $H_{30}$. Thus, the curve 16 corresponds to $P0=-20°$, the curve 17 to $P0=-10°$, the curve 18 to $P0=0°$, and the curve 19 to $P0=+20°$.

It is thus seen that by choosing a phase curve of the sum channel corresponding to a phase difference P0 close to 0°, one obtains a phase compensation between the sum channel and the difference channel. In order to show how this phase compensation is carried out, the phase curve 18 ($P0=0°$) of FIG. 3 has been reproduced on FIG. 4.

Figure 5:
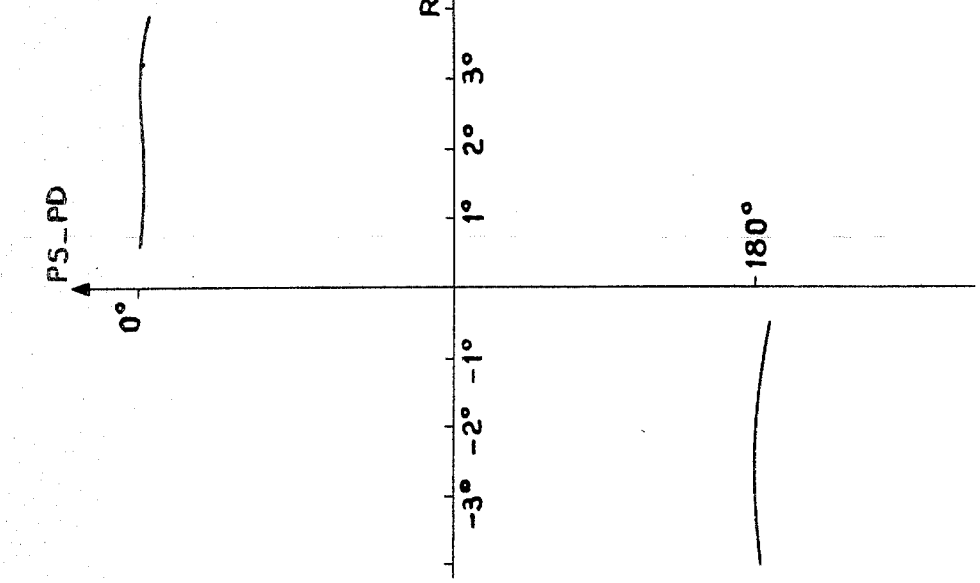
FIG. 5 illustrates the curve giving the phase difference between the sum and difference channels.

The explanation of the phase compensation has been given by considering the field radiated by the horn, however it is easily realized that this phase compensation is kept for the field radiated by the aerial system, i.e. by the reflector associated to the horn. By way of indication, FIG. 5 gives the variation of the phase difference obtained between the sum and difference channels for P0 close to 0°, the measurements having been carried out by using the complete aerial system. It will be observed that this variation is lower than 5°. On this FIG. 5, the phase difference is noted $PS-PD$ and the radiation angle is noted R; this radiation angle is measured with respect to the axis of the aerial system which is different from the axis of the horn. The variations of the phase difference P0 between the modes $H_{10}$ and $H_{30}$ are obtained by varying the length L1 of the part 4 of the horn. This part 4 is called the phasing section.

It is clear that such a phase compensation may be carried out with other modes in sum channel and in difference channel. Besides, the sum channel may comprise more than two modes, and the difference channel more than one mode. It will then be observed that the phase control may also be carried out over the modes of the difference channel. It will be observed that the characteristics of the invention may also be implemented in pyramidal horns.

I claim:

1. A multimode horn for propagating energy supplied thereto comprising:
   a horn section having an input aperture and an output aperture; and
   mode generating and phasing means coupled to said input aperture for providing thereto said supplied energy in modes $H_{10}$, $H_{20}$ and $H_{30}$, the sum of modes $H_{10}+H_{30}$ and $H_{20}$ being phase related such that their phase difference at the center of the output aperture of said horn section is approximately 0°.

2. A multimode horn, according to claim 1, wherein said horn section is an H plane horn.

References Cited
UNITED STATES PATENTS
3,373,431   3/1968   Webb _____ 343—786

R. D. BENNETT, Primary Examiner

H. C. WAMSLEY, Assistant Examiner

U.S. Cl. X.R.
343—16